3,536,332
SEALING DEVICE FOR A ROTARY ELEMENT
Alfred Pitner, Paris, France, assignor of one-half to S.A. Nadella, Malmaison, France, a French body corporate
Filed Apr. 23, 1968, Ser. No. 723,526
Claims priority, application France, May 8, 1967, 105,486
Int. Cl. F16j 15/16, 15/42
U.S. Cl. 277—25                                                10 Claims

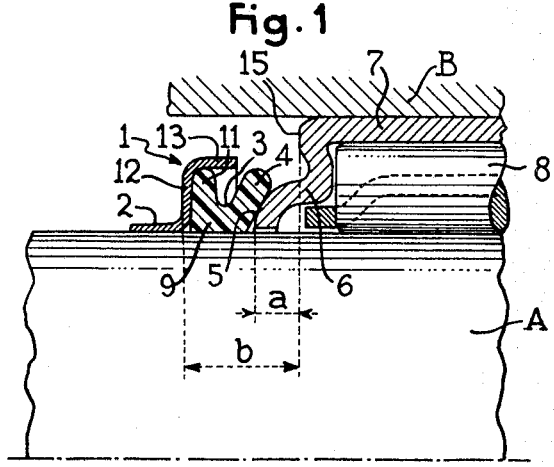
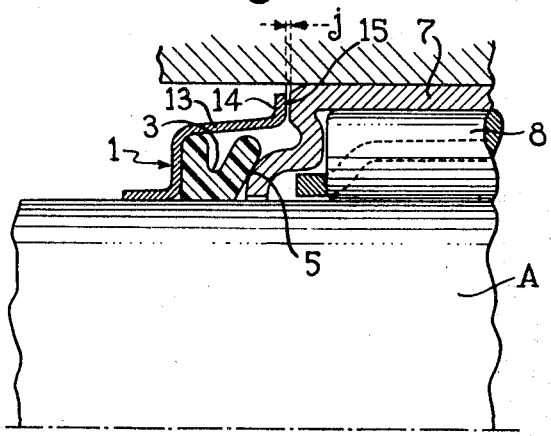

ABSTRACT OF THE DISCLOSURE

Device for affording a seal between two relatively rotatable elements. The device comprises a flexible sealing ring having a sealing lip which is connected to rotate with one of the elements by axially bearing inside a rigid collar fixed to said one of the elements and by a radial pressure of the ring against the collar.

---

The present invention relates to devices for affording a seal between two elements that are rotatable relative to each other, for example a shaft and a wall through which the shaft extends, said devices comprising a ring of relatively flexible material which is connected to rotate with one of said elements and provided with an annular lip in axial contact with the other element.

In a known device, the sealing ring comprises a relatively massive part which directly grips the shaft. With such an arrangement, when the shaft rotates at high speed, the effect of centrifugal force can be such as to release the grip of the massive part on the shaft and this results in relative rotation bringing about wear and even an axial displacement which is harmful to the seal in contact with the lip and in any case an imperfect seal. It is difficult to overcome this effect by increasing the grip of the sealing ring on the shaft since the high deformation of the massive part which would result would alter the shape of the sealing lip.

Another known device consists of a complex system comprising a metal fixing ring, a spring bearing against the sealing lip and a part constituting a bellows for connecting the sealing lip to the metal ring. Such systems are usually expensive and often have an unacceptable overall axial length so that their use is only justified in applications where it is necessary to seal in the case of a fluid under pressure.

The object of the invention is to provide a sealing device which is simpler than the last-mentioned device and more effective than the first-mentioned device. In the device according to the invention, the sealing ring is connected to rotate with said one of said elements by an axial bearing thereof inside a collar of relatively rigid material which is fixed to said one of said elements and by a radial pressure of the ring against the element or against a part of said collar.

The double clamping of the ring thus achieved is in principle sufficient to guarantee the fixing thereof to the collar which can be itself fixed in an unalterable manner on the element with no difficulty, so that the invention affords a very simple solution to the sealing problem.

The collar has advantageously a Z- or U-shaped section defining two cylindrical portions which are spaced apart radially, one of which grips the element whereas the other serves to retain the sealing lip and at the same time protects said lip, which is of non-rigid material, against danger of deterioration or destruction in the course of handling.

Further features and avantages of the invention will be apparent from the ensuing description with reference to the accompanying drawing.

In the drawing:

FIG. 1 is an axial sectional view of a sealing device between a rotating shaft and the outer ring of a needle bearing, and FIG. 2 is a similar view of a modification of the device shown in FIG. 1.

The sealing device shown in FIG. 1 comprises a rigid collar 1 having a Z-shaped section and fixed to the shaft A by the interference fit of a cylindrical portion 2, and a flexible sealing ring 3, the lip 4 of which is frustoconical and in sealing contact with the convex face 5 of the curved radial wall or flange 6 of the outer ring 7 of a needle bearing 8 interposed between the shaft A and the wall B.

The ring 3 has a V-shaped section defining, in addition to the sealing lip 4, a median cylindrical portion 9 which grips the shaft A, and a radial retaining lip 11 which exerts an axial pressure against the plane radial portion 12 of the collar and is radially gripped between the shaft A and an axial cylindrical skirt portion 13 adjacent to the radial portion 12 of the collar 1.

If, in the course of operation, centrifugal force tends to reduce the grip of the ring on the shaft A, this effect is compensated by the radial compresson of the lip 11 in contact with the skirt portion 13 so that the flexible ring cannot rotate relative to the shaft. It is, however, possible to provide for the ring additional fixing means, such as the adherence of the ring to the fixing collar or, preferably, the combination of projections moulded on the ring with recesses cut or pressed in the fixing collar, for example in accordance with the teaching of French patent application No. 64,258 filed on June 6, 1966.

The bearing of the lip 4 on the hard polished face 6 is initially regulated, independently of the centrifugal force, which tends to reduce the pressure of contact while allowing the rejection of foreign bodies, by the elastic compression which the lip 4 undergoes in the course of the axial fitting of the collar 1, whose axial position relative to the ring 7 of the bearing 8 can be determined, upon assembly, by the abutment on the face 15 of the bearing ring of an extension 14, in the form of a flange, of the skirt portion 13 (FIG. 2) so as to respect—without involving tolerances other than those related to the distance $a$ between the portions 5 and 15 of the bearing ring 7— the distance $b$ between the collar 1 and this bearing ring. The operational clearance $j$ (FIG. 2) is created by the release of the slight elastic deformation undergone by the assembly comprising the plane portion 12 and the skirt portion 13 during the axial fitting of the collar 1 under the effect of the axial thrust applied for this purpose.

The extension 14 of the skirt portion 13 which ensures that the collar has the required axial position can obviously be replaced by a mandrel which bears against the plane face 12 of the collar 1 so as to drive it along the shaft, the end of this mandrel abutting the face 15 of the bearing ring 7.

Although specific embodiments of the invention have been described, many modifications and changes may be made therein without departing from the scope of the invention as defined in the appended claims.

Having now described my invention what I claim as new and desire to secure by Letters Patent is:

1. A sealing device combined with two elements which are rotatable relative to each other about an axis, for example a shaft and a wall through which said shaft extends, said device comprising a ring of relatively flexible material having an annular retaining portion and an annular sealing lip portion, and means fixing said retaining portion to one of said elements so that said retaining portion rotates therewith in operation of the device, said lip portion being in axial contact with the other of said elements, said means comprising a collar of relatively rigid material in direct radial contact with said one of said elements and having an annular portion encompassing said retaining portion and in spaced relation to said lip portion, and means securing said collar to said one of said elements, said retaining portion, said annular portion of said collar and said one of said elements being so adapted and arranged that said retaining portion axially bears against said collar and exerts a pressure against said annular portion of said collar radially of said axis of sufficient magnitude to ensure that said ring rotates with said collar in operation of the device.

2. A sealing device combined with two elements which are rotatable relative to each other about an axis, for example a shaft and a wall through which said shaft extends, said device comprising a ring of relatively flexible material having an annular retaining portion and an annular sealing lip portion, and means fixing said retaining portion to one of said elements so that said retaining portion rotates therewith in operation of the device, said lip portion being in axial contact with the other of said elements, said means comprising a collar of relatively rigid material in direct radial contact with said one of said elements and having an annular portion encompassing said retaining portion and in spaced relation to said lip portion, and means securing said collar to said one of said elements, said retaining portion, said annular portion of said collar and said one of said elements being so adapted and arranged that said retaining portion axially bears against said collar and is compressed radially of said axis between said annular portion of said collar and said one of said elements to an extent ensuring that said ring rotates with said collar and said one of said elements in operation of the device.

3. A device as claimed in claim 2, wherein said ring has a V-shaped section which defines, in addition to said sealing lip portion and said retaining portion, a median portion which grips said one of said elements.

4. A device as claimed in claim 1, wherein said sealing lip portion is in elastically yieldable contact with a curved face on said other of said elements.

5. A device as claimed in claim 1, wherein said sealing lip portion is in contact with a face on a portion of a bearing ring which constitutes said other of said elements and which, owing to its function has a surface condition which perimts an intimate contact with the sealing lip portion and has a good resistance to wear.

6. A device as claimed in claim 5, wherein said portion on which said bearing face is formed is an extension of said rolling bearing ring which is of cold-formed sheet steel which had been subsequently subjected to a finishing treatment imparting thereto appropriate hardness.

7. A device as clamed in claim 1, wherein the force with which said sealing lip portion bears elastically against said other of said elements is produced with precision and independently of the general mechanical tolerances employed, by axially mounting said collar in a precise axial position, determined by contact, at the end of an axial mounting of a tool which mounts said collar, with a face on said other of said elements.

8. A device as claimed in claim 1, wherein said collar against which said ring bears is spaced from spaced from said sealing lip portion and has a diameter at least equal to that of said sealing lip portion so as to constitute a screen which shields said sealing lip portion from foreign bodies travelling towards said lip portion.

9. A sealing device in combination with a first element and a second element rotatable in said first element about an axis, said device comprising a sealing ring of relatively flexible material having an annular retaining portion tightly encompassing said second element and an annular sealing lip portion axially and flexibly bearing against said first element, and means for maintaining said ring in axial bearing relation to said first element and for preventing said ring from rotating on said second element in operation of the device, said means comprising a collar of relatively rigid material having a first substantially cylindrical portion encompassing and contacting said retaining portion and in spaced relation to said lip portion, a second cylindrical portion which grips said second element to such extent that said collar does not rotate on said second element in operation of the device, and an intermediate annular portion extending radially of said axis and interconnecting said first portion and said second portion of said collar, said retaining portion of said ring being in axial contact with said intermediate annular portion.

10. A device as claimed in claim 9, wherein the force with which said sealing lip portion bears elastically against said first element is produced with precision and independently of the general mechanical tolerances employed, by axially mounting said collar in a precise axial position, determined by the contact, at the end of the axial mounting, of an extension of said first portion of the collar with a face on said first element.

References Cited
UNITED STATES PATENTS
2,773,366   12/1956   Slaght _____ 277—95 X

FOREIGN PATENTS
1,481,957   4/1967   France.

SAMUEL ROTHBERG, Primary Examiner

U.S. Cl. X.R.

277—84, 95; 64—17